April 9, 1929.  S. W. SPARKS  1,708,851
GATE VALVE
Filed Nov. 20, 1925  2 Sheets-Sheet 1
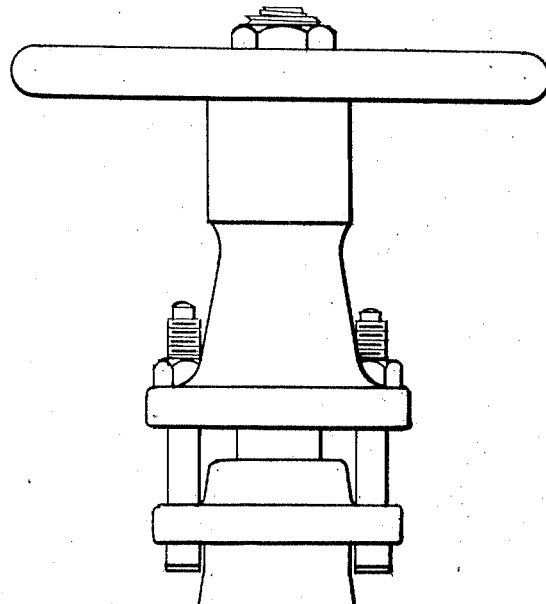
FIG. I.
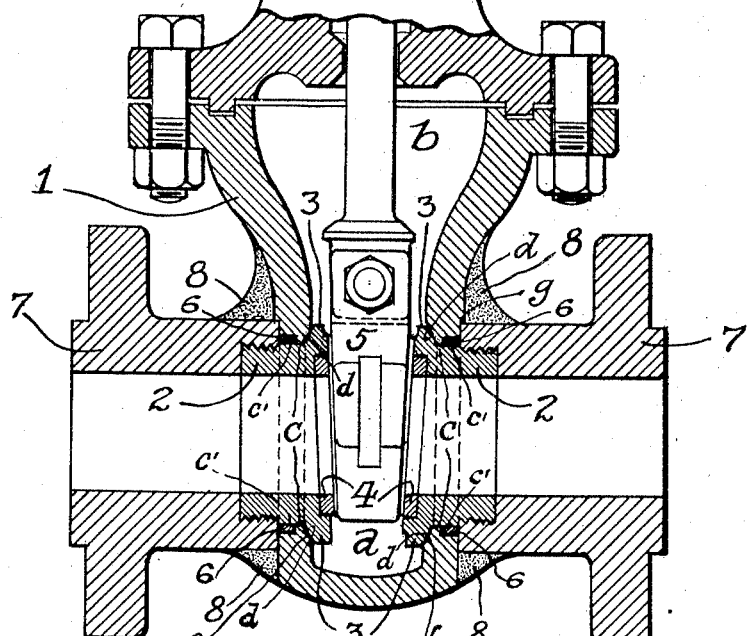
FIG. II.
INVENTOR:
Stanley W. Sparks.
BY  W. H. Swenarton,
His ATTORNEY.

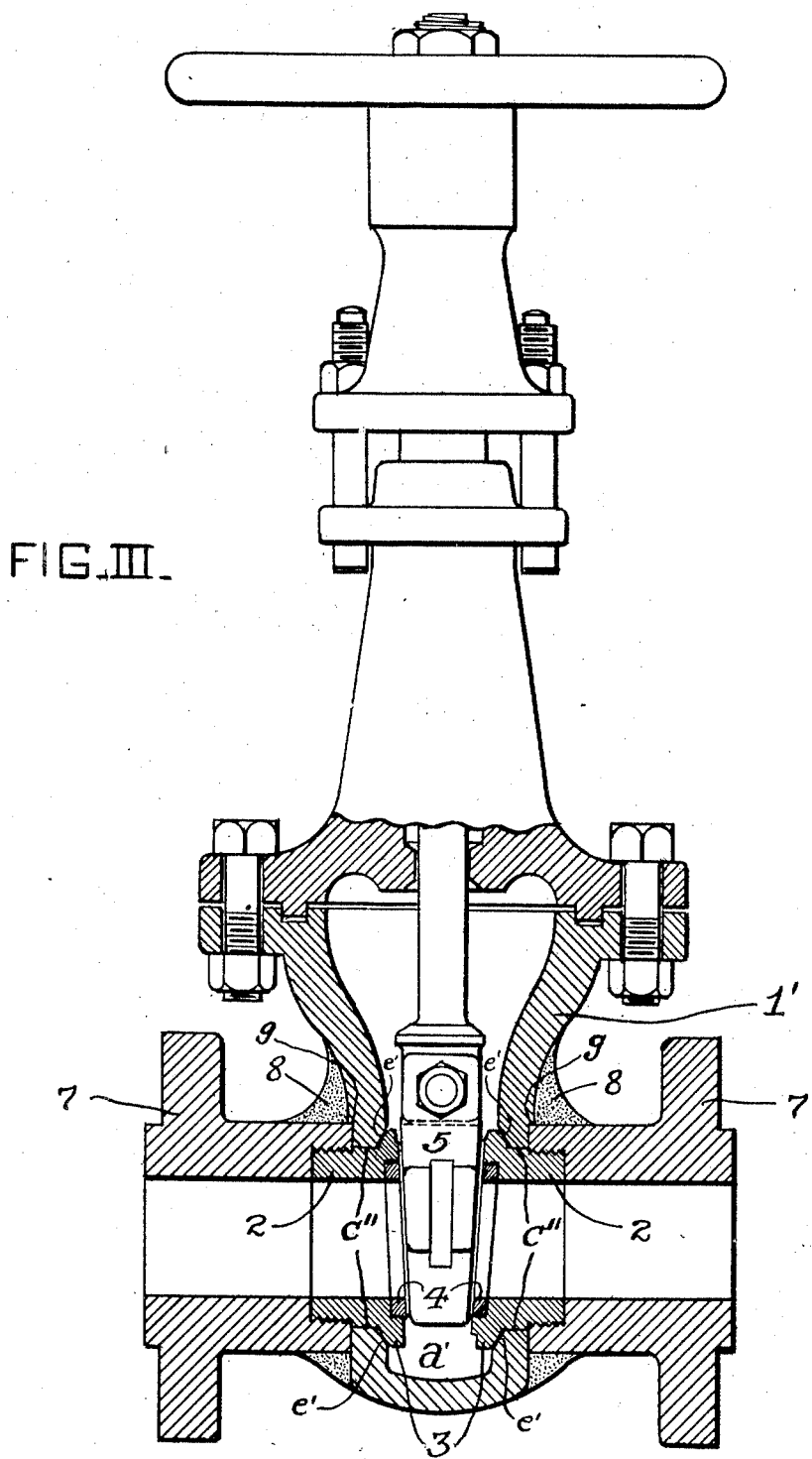

Patented Apr. 9, 1929.

1,708,851

UNITED STATES PATENT OFFICE.

STANLEY W. SPARKS, OF SUMMIT, NEW JERSEY, ASSIGNOR TO THE COLUMBUS MACHINE COMPANY, OF COLUMBUS, OHIO, A CORPORATION OF OHIO.

GATE VALVE.

Application filed November 20, 1925. Serial No. 70,207.

This invention relates to improvements in gate valves and has for its principal objects the production of a valve of this type which is extremely resistant to distortion or leakage due to high pressures and temperatures and is economical to manufacture, as well as attractive in appearance.

My invention is fully set forth in detail in the following description and drawings forming a part thereof in which Figure 1 is an elevation partially in section of my improved valve, Fig. 2 is an enlarged detail vertical section of the sealing ring and the contacting parts of a valve body.

Fig. 3 is a plan view of a modification of the valve construction shown in Fig. 1, and Fig. 4 is a vertical fragmentary section of a portion of the internal bushing and the contacting parts of the valve body hub member.

Referring to the drawings and construction shown therein, the reference numeral 1 designates the casing of the valve body proper, which valve body, as shown, is provided with a lower seat or chamber $a$ of oblong cross section and an upper or heat-radiation chamber $b$ which is flared at the top and is of substantially circular cross section adjacent the top thereof. The external configuration of the valve body may be either substantially cylindrical or conform to a cylinder which is flattened on two sides thereof. The walls of said casing adjacent the chamber $a$ are provided with lateral apertures $c$ which are adapted to receive internal bushing members 2, each of which is of substantially smaller external diameter than the maximum internal diameter of the recess $c'$ and has an annular peripheral flange 3 at its inner end, that in turn has a curvilinear rear face $d$, the same preferably being arc-shaped, the function of which is hereinafter described. The said inner end of each bushing is provided with a recess into which is threaded a removable oblique valve seat or ring 4, and as shown, the configuration of each bushing is such that when the same is substantially centered within the apertures $c$, the inner valve face thereof will lie at an oblique angle conforming to the angularity of the valve face of a gate member 5 with which it is adapted to co-operate.

Compression sealing rings 6 which are of a diameter slightly over-size with respect to the diameter of the recesses $c'$, serve not only to completely seal the joint between the valve casing and the bushing, but also for the purpose of permitting of the proper centering and adjusting of said bushing after the insertion of the same with respect to a master gate temporarily employed for the purpose of such adjustment in the manner hereinafter described. As shown, said valve body casing has an oblique inner face $e$, which latter is adapted to have line contact with the said curvilinear rear or arc face $d$ of the flange 3 when the said bushing is in its final adjusted position in the aperture $c$, as indicated at the point designated by the reference letter $f$.

Hollow hub members 7, which are counterbored, are threaded onto the outer threaded portions of the respective internal bushings, and as shown, these hub members as they are screwed on, serve to force the compression sealing rings 6 into the position shown in Fig. 1, with the consequence that the joint between the hubs and internal bushings and the walls of the valve chamber will become tightly sealed and will be rendered capable of withstanding extremely high pressures. Preferably the outer walls of the valve chamber are recessed, as indicated by the reference letter $g$, to receive the inner ends of the hubs 7. Fillet welds 8 serve to more effectively seal the joints between the valve casing, the hub members, the internal bushings and the compression rings, as well as to further strengthen the body section of the valve, at the point where the greatest internal strain is caused, either by high internal pressures while operating at high temperatures or by the wedging force of the tapered wedge gate employed, when it is closed and in engagement with the seats of the internal bushing. These welds also prevent or resist deformation or distortion with permanent set of the side wall structure of the body section, which feature is of the utmost importance, as in practice the deformation of the side wall structure changes the angularity of the valve seats and not only necessitates regrinding of the same, but often renders the same wholly ineffective and useless. These welds can be made either by means of the electric arc or by the well known oxy-acetylene welding methods.

In the assembly of the valve, a master gate of identically the same taper as the seats on the bushing, is substituted for the regular gate of the valve and then when inserting the bushings into the apertures c, the valve seats on the inner end of the internal bushings can be turned to their proper position, whereupon the compression sleeve or ring 6 is driven into the space between the perimeter of the internal bushing member and the inner circumference of the recesses c' following which and prior to the removal of the master gate, the said compression ring 6 tightly driven into the proper position, thus holding the bushing not only in a central position in the apertures, but in a proper position with respect to its taper and valve seats carried thereby to cause the same to properly engage and co-operate with the gate 5 when the same is substituted for the master gate aforesaid. Flanged hub members, as previously stated, are screwed inwardly against the respective compression rings and thus the same are forced still further into the space between the internal bushing and the circumference of the apertures c, thus making a tight joint as previously set forth.

In Figs. 3 and 4 I have illustrated a valve of substantially identical design with that set forth in Figs. 1 and 2, with the exception that in lieu of providing compression sealing rings, I insert the internal bushings directly in apertures c'' in which they tightly fit, or if desired, the same may be threaded into the side walls 1' of the lower valve chamber a'. As shown, the curvilinear face of the peripheral flange of the bushing directly engages the inclined face e' of the lower portion of the walls of the valve chamber a'. This construction shown in Figs. 3 and 4 is not as convenient for assembly purposes as that shown in Figs. 1 and 2 nevertheless, for many purposes once the valve is assembled, is highly satisfactory.

The walls of the heat-radiation chamber b are peculiarly resistant to distortion under high temperatures and pressures not only because of the flaring configuration thereof, but also because of the fact that the same being very substantially enlarged at the top with respect to the bottom of said chamber the dissipation of the heat from the interior of said chamber through radiation and conduction is greatly facilitated.

Having thus described my invention, what I claim and desire to obtain by Letters Patent of the United States is:

1. In a valve, the combination comprising a valve body member having opposing lateral apertures, each adapted to receive an internal bushing member, the inner faces of the valve body immediately adjacent the margins of said apertures being bevelled, internal bushing members fitted in said apertures, said bushing members having a curvilinear inner face in contact with the respective bevelled faces of said valve body and hub members secured to the outer ends of said bushing members.

2. In a valve, the combination comprising a valve body member having opposing lateral apertures, each adapted to receive an internal bushing member, the inner faces of the valve body immediately adjacent the margins of said apertures being bevelled, internal bushing members fitted in said apertures, said bushing members having a curvilinear inner face in contact with the respective bevelled faces of said valve body, hub members secured to the outer ends of said bushing members and compression sealing rings interposed between a portion of the marginal walls of said apertures and said internal bushings, and arranged to abut the inner ends of said hub members.

3. In a valve, the combination comprising a valve body member having opposing lateral apertures adapted to receive internal bushing members, the portion of the inner wall of the body member at the margins of said apertures being bevelled and the outer wall of said body member having annular marginal recesses at said apertures, internal bushing members each having an inner flanged end, said bushings being fitted in said apertures and being of considerable less external diameter than the diameter of said outer annular marginal recesses, compression sealing rings fitted into said outer annular marginal recesses and serving to seal the joint between the internal bushings and the body member and hub members fitted to the outer ends of the internal bushings respectively.

Signed at New York, in the county and State of New York, this 6th day of Nov., 1925.

STANLEY W. SPARKS.